US007946162B2

(12) United States Patent
Vennettilli et al.

(10) Patent No.: US 7,946,162 B2
(45) Date of Patent: May 24, 2011

(54) METHOD FOR ESTIMATING THE OXYGEN CONCENTRATION IN INTERNAL COMBUSTION ENGINES

(75) Inventors: Nando Vennettilli, Turin (IT); Massimiliano Maira, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

(21) Appl. No.: 12/397,427

(22) Filed: Mar. 4, 2009
(Under 37 CFR 1.47)

(65) Prior Publication Data

US 2010/0005872 A1 Jan. 14, 2010

(30) Foreign Application Priority Data

Mar. 4, 2008 (EP) .................................... 08003962

(51) Int. Cl.
*G01M 15/10* (2006.01)

(52) U.S. Cl. ................................. 73/114.73; 73/114.31

(58) Field of Classification Search .. 73/114.31–114.34, 73/114.37, 114.74
See application file for complete search history.

(56) References Cited

U.S. PATENT DOCUMENTS

| | | | | |
|---|---|---|---|---|
| 5,531,208 | A * | 7/1996 | Hasegawa et al. | 123/673 |
| 5,889,205 | A * | 3/1999 | Treinies et al. | 73/114.32 |
| 5,974,870 | A * | 11/1999 | Treinies et al. | 73/114.33 |
| 6,095,127 | A * | 8/2000 | Kolmanovsky et al. | 123/676 |
| 6,508,241 | B2 * | 1/2003 | Miller et al. | 123/672 |
| 6,688,166 | B2 * | 2/2004 | Gerhard et al. | 73/114.32 |
| 7,117,078 | B1 | 10/2006 | Gangopadhyay | |
| 7,318,342 | B2 * | 1/2008 | Boehm et al. | 73/114.42 |
| 2002/0133286 | A1 * | 9/2002 | Kolmanovsky et al. | 701/104 |
| 2002/0179060 | A1 * | 12/2002 | Engel et al. | 123/494 |
| 2002/0198649 | A1 * | 12/2002 | Stotsky et al. | 701/113 |
| 2004/0084015 | A1 * | 5/2004 | Sun et al. | 123/399 |
| 2009/0320577 | A1 * | 12/2009 | Vennettilli et al. | 73/114.31 |
| 2010/0175674 | A1 * | 7/2010 | Vennettilli et al. | 123/703 |

* cited by examiner

*Primary Examiner* — Freddie Kirkland, III

(74) *Attorney, Agent, or Firm* — Ingrassia Fisher & Lorenz, P.C.

(57) ABSTRACT

A method for estimating the oxygen concentration in an internal combustion engine that includes, but is not limited to an intake manifold, an exhaust manifold, an EGR system, a throttle valve, an air mass sensor for measuring a fresh air flow ($\dot{m}_{thr}$) entering the intake manifold through the throttle valve, and cylinders. The method includes, but is not limited to the steps of estimating the total gas flow ($\dot{m}_o$) entering the cylinders, calculating the EGR gas flow ($\dot{m}_{egr}$), calculating the air fraction ($f_{\_air-em}$) of the gas flowing in the exhaust manifold, calculating the air mass ($m_{im\_air}$) entering the cylinders based on the air fraction ($f_{\_air-em}$) in the exhaust manifold, on the total gas flow ($\dot{m}_o$) entering the cylinders, on the EGR gas flow ($\dot{m}_{egr}$) and on the fresh air flow ($\dot{m}_{thr}$), calculating the total mass ($m_{im}$) in the intake manifold based on the fresh air flow ($\dot{m}_{thr}$), on the EGR gas flow ($\dot{m}_{egr}$) and on the total gas flow ($\dot{m}_o$) entering the cylinders, calculating the air fraction ($f_{air\_im}$) in the intake manifold based on the air mass ($m_{im\_air}$) entering the cylinders and the total mass ($m_{im}$) in the intake manifold, and calculating the oxygen mass concentration ($[O_2]_{m\_im}$) in the intake manifold based on the air fraction ($f_{air\_im}$) in the intake manifold.

16 Claims, 2 Drawing Sheets

METHOD FOR ESTIMATING THE OXYGEN CONCENTRATION IN INTERNAL COMBUSTION ENGINES

CROSS-REFERENCE TO RELATED APPLICATION

This application claims priority to European Patent Application No. 08003962.1-1263, filed Mar. 4, 2008, which is incorporated herein by reference in its entirety.

TECHNICAL FIELD

The present invention relates to the estimation of the level of oxygen concentration in the intake manifold of combustion engines.

BACKGROUND

Oxygen control systems and methods for combustion engines are well known in the art, for instance from U.S. Pat. No. 7,117,078. In conventional internal combustion engines there are an exhaust gas recirculation (EGR) system, an air mass sensor (or air flow meter), a pressure sensor and one or more temperature sensors.

The EGR system includes a controllable EGR valve able to modulate the gas flow from the exhaust manifold to the intake manifold. The recirculation gas can be taken in any point of the exhaust line, for example downstream the turbine or downstream the after-treatment point and the gas can be reintroduced into any point of the intake line, for example upstream one or more compressors or of the intercooler.

The air mass sensor is able to measure the fresh air flow entering the intake manifold through a throttle valve. The pressure sensor is able to measure the pressure of the gas and is placed in the intake manifold downstream the mixing point between the fresh air flow and the recirculated gas flows.

As stated above, there may be only one or more temperature sensors. If there is only one sensor (hardware configuration 1—HW1), it is placed in the intake manifold downstream the mixing point of the fresh air and the recirculated gas flows; if there are two sensors (hardware configuration 2—HW2), they can be placed near the throttle and the EGR valve. In conventional engines there is an electronic control unit arranged to estimate the fuel flow injected into the cylinders (software configuration 1—SW1), as well as the gas flow through the EGR valve (software configuration 2—SW2).

Known oxygen control systems evaluate the intake oxygen concentration assuming fluid-dynamic steady state conditions; the main drawback of this approach is the lack of precision in the oxygen concentration tracking during transient operations.

In view of the above, it is at least one object of the present invention to provide an improved method for estimating the intake oxygen concentration in combustion engines in both steady state and transient conditions. In addition, other objects, desirable features, and characteristics will become apparent from the subsequent detailed description, and the appended claims, taken in conjunction with the accompanying drawings and this background.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and use. Furthermore, there is no intention to be bound by any theory presented in the preceding background or the following detailed description.

Briefly, the method according to the invention is based on the use of the differential form of the total mass and air mass conservation equations, along with an observer approach based on the available sensors placed in the intake manifold. The invention is applicable in both Diesel and gasoline engines.

Figure 1:
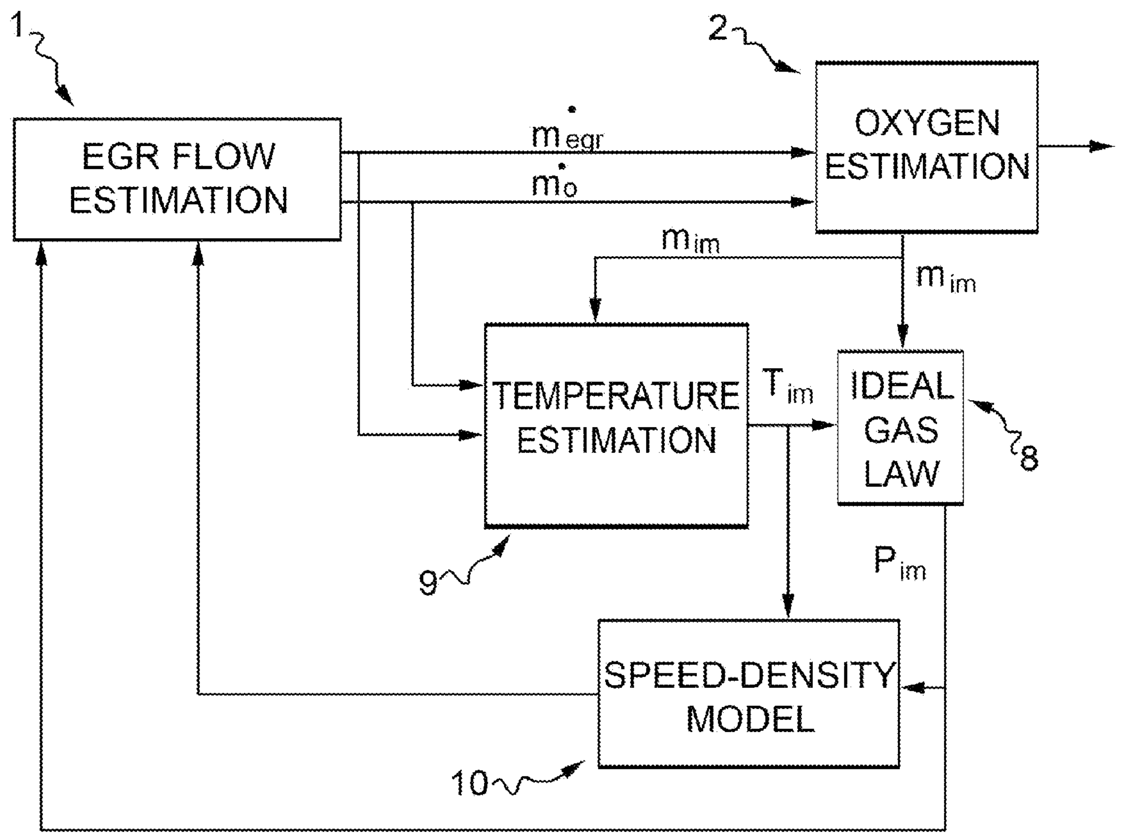
FIG. 1 is a block diagram of the operations to be performed according to the method of an embodiment of the invention.

FIG. 1 shows a block diagram of the operations to be performed according to the method of the invention. In the description that follows, two configurations are considered: the first one is that with only one temperature sensor, the second one is that with two temperature sensors. In FIG. 1, a first block 1 performs an EGR gas flow estimation, which is dependent on the software configuration SW1 or SW2.

In the first configuration SW1, no external input of the EGR gas flow is available. The first block 1 estimates therefore an EGR gas flow $\dot{m}_{egr}$ (made up of residual air after combustion and combustion gas) according to the following equation:

$$\dot{m}_{egr}=\dot{m}_o-\dot{m}_{thr}+P(p_{im\_sens}-p_{im}) \quad (1)$$

where $\dot{m}_{thr}$ is a fresh air flow through the throttle valve measured by a sensor or known from a model, $\dot{m}_o$ is an estimated total gas flow entering the cylinders (made up of residual air after combustion, combustion gas and fresh air) and it is provided by an electronic control unit of the engine, $p_{im\_sens}$ is a pressure in the intake manifold measured by a sensor, $p_{im}$ is an estimated pressure in the intake manifold (calculated as here below disclosed) and P is a predetermined proportional factor. The difference between $\dot{m}_o$ and $\dot{m}_{thr}$ is a steady state term, and the difference between $p_{im\_sens}$ and $p_{im}$ is an error feedback used to calculate a proportional closed loop correction.

In the second configuration SW2, a theoretical EGR gas flow $\dot{m}_{egrTH}$ is provided by the electronic control unit of the engine. In this case, it is possible to correct either the EGR gas flow estimation (if the speed density model, below disclosed, is considered more precise than the theoretical EGR gas flow $\dot{m}_{egrTH}$ estimation) or the theoretical engine flow (if the theoretical EGR gas flow $\dot{m}_{egrTH}$ estimation is considered more precise than the speed density model).

In the second configuration SW2, the following two equations are alternatively implemented:

$$\dot{m}_{egr}=\dot{m}_{egrTH}+P.I.(p_{im\_sens}-p_{im}) \quad (2)$$

$$\dot{m}_o=\dot{m}_{oTH}+P.I.(p_{im\_sens}-p_{im}) \quad (3)$$

where $\dot{m}_{oTH}$ is a theoretical total gas flow entering the cylinders calculated as below disclosed and P.I. is a predetermined proportional-integral controller. These two different equations may be available alternatively or jointly. The outputs of block 1 are the EGR gas flow $\dot{m}_{egr}$ and the estimated total gas flow $\dot{m}_o$.

In the first configuration SW1, the EGR gas flow $\dot{m}_{egr}$ is calculated according to equation (1) and the estimated total gas flow $\dot{m}_o$ is the theoretical total gas flow entering the cylinders $\dot{m}_{oTH}$. In the second configuration SW2, when the equation (2) is used, the estimated total gas flow $\dot{m}_o$ is the theoretical total gas flow $\dot{m}_{oTH}$; when the equation (3) is used, the EGR gas flow $\dot{m}_{egr}$ is the theoretical EGR gas flow $\dot{m}_{egrTH}$.

The outputs of block 1 are sent to an oxygen estimation block 2 which calculates the oxygen quantity in the intake manifold. The oxygen estimation block 2 is independent from the hardware and the software configuration and is depicted in FIG. 2.

Figure 2:
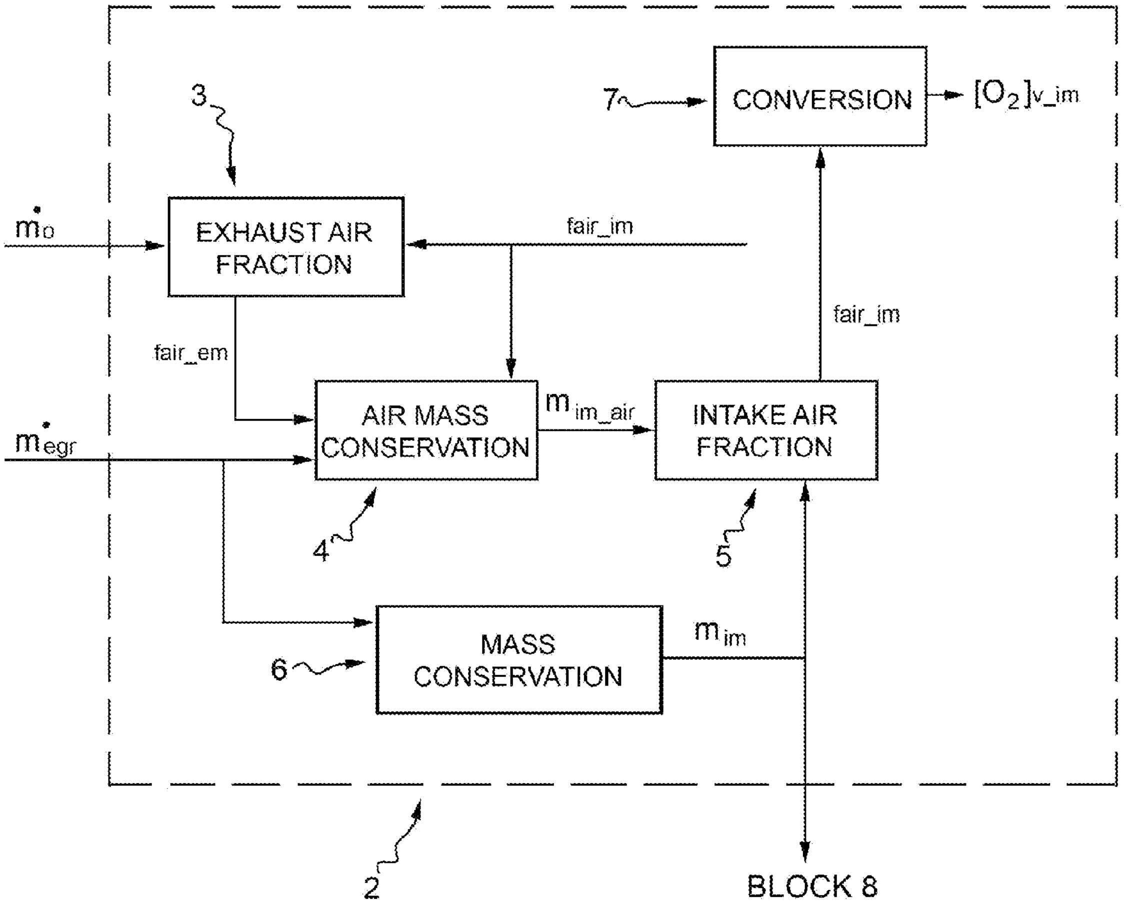
FIG. 2 is a block diagram of the operations to be performed by one of the blocks of FIG. 1.

In FIG. 2, a third bock 3 calculates an exhaust manifold air fraction $f_{air\_em}$ according to the following equation:

$$f_{air\_em} = \frac{f_{air\_im}\dot{m}_o - (A/F)_{st}\dot{m}_{fuel}}{\dot{m}_o + \dot{m}_{fuel}} \quad (4)$$

where $f_{air\_im}$ is an intake manifold air fraction (representative of the percentage of residual air after combustion and fresh air), calculated as here below disclosed, $(A/F)_{st}$ is a stoichiometric air to fuel ratio and $\dot{m}_{fuel}$ is a predetermined fuel mass introduced into the cylinders, this predetermined value being provided by the electronic control unit. The exhaust manifold air fraction $f_{air\_em}$ is therefore calculated as the ratio between the residual air mass after combustion (given by the air introduced into the cylinder, $f_{air\_im}*\dot{m}_o$, minus the air burnt during combustion which, supposing complete combustion, is equal to the term $(A/F)_{st}*\dot{m}_{fuel}$) and the total mass introduced into the cylinder (given by the total gas trapped during the intake stroke ($\dot{m}_o$) plus the injected fuel mass $\dot{m}_{fuel}$).

The exhaust air fraction $f_{air\_em}$ is sent to a block 4 in which the air mass conservation equation is implemented:

$$\frac{dm_{im\_air}}{dt} = \dot{m}_{thr} + f_{air\_em}\dot{m}_{egr} - f_{air\_im}\dot{m}_o \quad (5)$$

In order to obtain an estimated air mass $m_{im\_air}$ entering the cylinders (made up of residual air after combustion and fresh air).

The estimated air mass $m_{im\_air}$ is sent to a block 5 where it is used to calculate the intake manifold air fraction $f_{air\_im}$ according to the following equation:

$$f_{air\_im} = \frac{m_{im\_air}}{m_{im}} \quad (6)$$

where $m_{im}$ is the total mass in the intake manifold (made up of residual air after combustion, combustion gas and fresh air), calculated as here below disclosed. The output of the block 5 is sent back to the blocks 3 and 4 so as to close a loop to perform the calculations above disclosed.

The total mass in the intake manifold $m_{im}$ is calculated in a mass conservation block 6 according to the following equation:

$$\frac{dm_{im}}{dt} = \dot{m}_{thr} + \dot{m}_{egr} - \dot{m}_o \quad (7)$$

The intake oxygen volume concentrations can be expressed either in terms of intake manifold air fraction $f_{air\_im}$ or directly in terms of oxygen mass concentration $[O_2]_{m\_im}$ assuming that intake and exhaust mixtures are composed only of oxygen and nitrogen.

In this way it is possible to obtain, in a conversion block 7 connected to the block 5, a physical relationship between the intake manifold air fraction $f_{air\_im}$ and the oxygen mass concentration $[O_2]_{m\_im}$, according to the following equations:

$$[O_2]_{m\_im} = [O_2]_{m\_air} f_{air\_im} \quad (8)$$

$$[O_2]_{v\_im} = \frac{(M_{N2}/M_{O2})[O_2]_{m\_im}}{1 + (M_{N2}/M_{O2} - 1)[O_2]_{m\_im}} \quad (9)$$

where $[O_2]_{m\_air}$ is the oxygen mass concentration in pure air, $[O_2]_{v\_im}$ is a oxygen volume concentration, and $M_{N2}$ and $M_{O2}$ are the nitrogen and oxygen molecular weights.

Returning now to FIG. 1, the total mass in the intake manifold $m_{im}$ is sent to a block 8 where the estimated pressure in the intake manifold $p_{im}$ is obtained through the ideal gas law:

$$p_{im} = \frac{R_{im} m_{im} T_{im}}{V_{im}} \quad (10)$$

where $V_{im}$ is the geometrical volume of the intake manifold (a predetermined value), $R_{im}$ is the constant R of the gas and $T_{im}$ is the temperature of the intake manifold calculated as here below disclosed.

The temperature $T_{im}$ is calculated in a block 9 depending on the hardware configuration HW1 or HW2. The block 9 receives the total mass in the intake manifold $m_{im}$ value from the block 2.

In the first configuration HW1, the following equations are used:

$$T_{im\_ideal} = \frac{p_{im\_sens} V_{im}}{R_{im} m_{im}} \quad (11)$$

$$\begin{cases} T_{im\_obs} = (L.P.F) T_{im} \\ T_{im} = T_{im\_ideal} + P..I.(T_{im\_sens} - T_{im\_obs}) \end{cases} \quad (12)$$

where L.P.F is a predetermined low pass filter, $T_{im\_sens}$ is the temperature measured by the temperature sensor and $T_{im\_obs}$ is an observed temperature value generated by a low pass filter model taking into account the sensor time constant.

A temperature observer is used to speed-up the slow dynamic characteristics of the intake manifold temperature sensor by comparing the measured value, $T_{im\_sens}$, with the observed one, $T_{im\_obs}$, and correcting it with a proportional integral closed loop correction.

In the second configuration HW2, the two temperature sensors measure the temperature of the gas flowing through the throttle valve, $T_{thr}$, and through the EGR valve, $T_{egr}$, respectively. In this case, two alternatives are available.

The first alternative uses a differential form, according to the following equations:

$$\frac{dp_{im}}{dt} = \frac{R_{im}}{c_{v_{im}} V_{im}} \left[\dot{m}_{thr} T_{thr} c_{p_{thr}} + \dot{m}_{egr} T_{egr} c_{p_{egr}} - \dot{m}_o T_{im} c_{p_{im}}\right] \quad (13)$$

$$T_{im} = \frac{p_{im} V_{im}}{R_{im} m_{im}} \quad (14)$$

where $c_{vim}$ is the constant volume specific heat of gas inside the intake manifold, $c_{pim}$ is the constant pressure specific heat of gas inside the intake manifold, $c_{pegr}$ is the constant pressure specific heat of the EGR gas flow and $c_{pthr}$ is the constant pressure specific heat of the throttle air flow.

The second alternative uses a steady state form, according to the following equation:

$$T_{im} = \frac{\dot{m}_{thr} T_{thr} + \dot{m}_{egr} T_{egr}}{\dot{m}_{thr} + \dot{m}_{egr}} \quad (15)$$

The temperature $T_{im}$, together with the estimated pressure $p_{im}$, is sent to a speed-density model block 10 in which the theoretical total gas flow entering the cylinders $\dot{m}_{oTH}$ is calculated starting from the intake manifold density according to the following equation:

$$\dot{m}_{oTH} = \frac{p_{im}}{R_{im} T_{im}} \eta_{vol} V_d \frac{N_{eng}}{120} \quad (16)$$

where $\eta_{vol}$ is the volumetric efficiency of the engine, $N_{eng}$ is the speed engine (rpm) and $V_d$ is the engine displacement. In order to guarantee physical coherence between the thermodynamic states in the intake manifold estimations, the intake density is calculated using the temperature and pressure estimations. The theoretical total gas flow $\dot{m}_{oTH}$ and the estimated pressure $p_{im}$ are sent back to the block 1 so as to close the loop.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for estimating an oxygen concentration in an internal combustion engine comprising an intake manifold, an exhaust manifold, an EGR system, a throttle valve, an air mass sensor for measuring a fresh air flow ($\dot{m}_{thr}$) entering the intake manifold through the throttle valve, and a plurality of cylinders, the comprising the steps of:

estimating a total gas flow ($\dot{m}_o$) entering the plurality of cylinders;

calculating an EGR gas flow ($\dot{m}_{egr}$);

calculating an air fraction ($f_{\_air—em}$) of a gas flowing in the exhaust manifold;

calculating a air mass ($m_{im\_air}$) entering the plurality of cylinders based at least in part on the air fraction ($f_{\_air—em}$) in the exhaust manifold, the total gas flow ($\dot{m}_o$) entering the plurality of cylinders, the EGR gas flow ($\dot{m}_{egr}$), and the fresh air flow ($\dot{m}_{air}$);

calculating a total mass ($m_{im}$) in the intake manifold based at least in part on the fresh air flow ($\dot{m}_{thr}$), the EGR gas flow ($\dot{m}_{egr}$), and the total gas flow ($\dot{m}_o$) entering the plurality of cylinders;

calculating the air fraction ($f_{air\_im}$) in the intake manifold based at least in part on the air mass ($m_{im\_air}$) entering the plurality of cylinders and the total mass ($m_{im}$) in the intake manifold; and calculating a oxygen mass concentration ($[O_2]_{m\_im}$) in the intake manifold based on the air fraction ($f_{air\_im}$) in the intake manifold.

2. The method of claim 1, wherein an estimation of the total gas flow ($\dot{m}_o$) entering the plurality of cylinders and of the EGR gas flow ($\dot{m}_{egr}$) comprise the steps of:

determining an estimated pressure ($p_{im}$) and a measured pressure ($p_{im\_sens}$) in the intake manifold; and estimating a theoretical total gas flow ($\dot{m}_{oTH}$) entering the plurality of cylinders.

3. The method according to any of claim 2, wherein the theoretical total gas flow ($\dot{m}_{oTH}$) entering the plurality of cylinders is calculated according to the following equation:

$$\dot{m}_{oTH} = \frac{p_{im}}{R_{im} T_{im}} \eta_{vol} V_d \frac{N_{eng}}{120}$$

where $\eta_{vol}$ is a volumetric efficiency of the internal combustion engine, $N_{eng}$ is a speed engine (rpm) and $V_d$ is an engine displacement.

4. The method according to any of the claim 2, wherein the total gas flow ($\dot{m}_o$) entering the plurality of cylinders is calculated according to the following equation:

$$\dot{m}_o = \dot{m}_{oTH} + P.I.(p_{im\_sens} - p_{im})$$

where P.I. is a predetermined proportional-integral controller.

5. The method of claim 1, wherein an estimation of the total gas flow ($\dot{m}_o$) entering the plurality of cylinders and of the EGR gas flow ($\dot{m}_{egr}$) comprises the steps of:

determining an estimated pressure ($p_{im}$) and a measured pressure ($p_{im\_sens}$) in the intake manifold;

estimating a theoretical EGR gas flow ($\dot{m}_{egrTH}$); and estimating a theoretical total gas flow ($\dot{m}_{oTH}$) entering the plurality of cylinders.

6. The method of the claim 1, further comprising the step of determining an estimated temperature ($T_{im}$) in the intake manifold, wherein an estimated pressure ($p_{im}$) in the intake manifold is calculated according to the following equation:

$$p_{im} = \frac{R_{im} m_{im} T_{im}}{V_{im}} \quad (10)$$

where $V_{im}$ is a constant representative of a geometrical volume of the intake manifold, and $R_{im}$ is the constant R of the gas.

7. The method of the claim 6, further comprising the steps of measuring a temperature ($T_{im\_sens}$) in the intake manifold, wherein the estimated temperature ($T_{im}$) in the intake manifold is calculated according to the following equations:

$$T_{im\_ideal} = \frac{p_{im\_sens} V_{im}}{R_{im} m_{im}}$$

$$\begin{cases} T_{im\_obs} = (L.P.F) T_{im} \\ T_{im} = T_{im\_ideal} + P..I.(T_{im\_sens} - T_{im\_obs}) \end{cases}$$

where $V_{im}$ is a constant representative of the geometrical volume of the intake manifold, $R_{im}$ is the constant R of the gas, L.P.F is a predetermined low pass filter and $T_{im\_obs}$ is an observed temperature value generated by a low pass filter model taking into account a temperature sensor time constant.

8. The method of claim 6, further comprising the step of measuring a temperature ($T_{thr}$) of the gas flowing through the throttle valve and a temperature ($T_{egr}$) of the gas flowing through an EGR valve of the EGR system, wherein the estimated temperature ($T_{im}$) of the intake manifold is calculated according to the following equation:

$$\frac{dp_{im}}{dt} = \frac{R_{im}}{c_{v_{im}} V_{im}}\left[\dot{m}_{thr} T_{thr} c_{p_{thr}} + \dot{m}_{egr} T_{egr} c_{p_{egr}} - \dot{m}_o T_{im} c_{p_{im}}\right]$$

where $c_{vim}$ is a gas constant volume specific heat, $c_{pim}$ is a constant pressure gas specific heat, $V_{im}$ is a constant representative of the geometrical volume of the intake manifold, $R_{im}$ is the constant R of the gas, $c_{pegr}$ is a constant pressure specific heat of the EGR gas flow and $c_{pthr}$ is the constant pressure specific heat of a throttle air flow.

9. The method according to claim 1, wherein the EGR gas flow ($\dot{m}_{egr}$) is calculated according to the following equation:

$$\dot{m}_{egr} = \dot{m}_{oTH} - \dot{m}_{thr} + P(p_{im\_sens} - p_{im})$$

where P is a predetermined proportional factor.

10. The method according to claim 1, wherein the EGR gas flow ($\dot{m}_{egr}$) is calculated according to the following equation:

$$\dot{m}_{egr} = \dot{m}_{egrTH} + P.I.(p_{im\_sens} - p_{im})$$

where P.I. is a predetermined proportional-integral controller.

11. The method according to claim 1, wherein the air fraction ($f_{\_air\text{—}em}$) of the gas flowing in the exhaust manifold is calculated according to the following equation:

$$f_{air\_em} = \frac{f_{air\_im}\dot{m}_o - (A/F)_{st}\dot{m}_{fuel}}{\dot{m}_o + \dot{m}_{fuel}}$$

where $(A/F)_{st}$ is a stoichiometric air to fuel ratio and $\dot{m}_{fuel}$ is a predetermined fuel mass introduced into the plurality of cylinders.

12. The method according to claim 1, wherein the air mass ($m_{im\_air}$) entering the plurality of cylinders is calculated according to the following equation:

$$\frac{dm_{im\_air}}{dt} = \dot{m}_{thr} + f_{air\_em}\dot{m}_{egr} - f_{air\_im}\dot{m}_o$$

13. The method according to claim 1, wherein the total mass ($m_{im}$) is calculated according to the following equation:

$$\frac{dm_{im}}{dt} = \dot{m}_{thr} + \dot{m}_{egr} - \dot{m}_o$$

14. The method according to claim 1, wherein the air fraction ($f_{air\_im}$) in the intake manifold is calculated according to the following equation:

$$f_{air\_im} = \frac{m_{im\_air}}{m_{im}}$$

15. The method according to claim 1, wherein the oxygen mass concentration ($[O_2]_{m\_im}$) in the intake manifold is calculated according to the following equations:

$$[O_2]_{m\_im} = [O_2]_{m\_air} f_{air\_im}$$

$$[O_2]_{v\_im} = \frac{(M_{N2}/M_{O2})[O_2]_{m\_im}}{1 + (M_{N2}/M_{O2} - 1)[O_2]_{m\_im}}$$

where $[O_2]_{m\_air}$ is the oxygen mass concentration in pure air, $[O_2]_{v\_im}$ is a oxygen volume concentration and $M_{N2}$ and $M_{O2}$ are nitrogen and oxygen molecular weights.

16. A method for estimating an oxygen concentration in an internal combustion engine comprising an intake manifold, an exhaust manifold, an EGR system, a throttle valve, an air mass sensor for measuring a fresh air flow ($\dot{m}_{thr}$) entering the intake manifold through the throttle valve, and a plurality of cylinders, the comprising the steps of:

estimating a total gas flow ($\dot{m}_o$) entering the plurality of cylinders;

calculating an EGR gas flow ($\dot{m}_{egr}$);

calculating an air fraction ($f_{\_air\text{—}em}$) of a gas flowing in the exhaust manifold;

calculating a air mass ($m_{im\_air}$) entering the plurality of cylinders based at least in part on the air fraction ($f_{\_air\text{—}em}$) in the exhaust manifold, the total gas flow ($\dot{m}_o$) entering the plurality of cylinders, the EGR gas flow ($\dot{m}_{egr}$), and the fresh air flow ($\dot{m}_{thr}$);

calculating a total mass ($m_{im}$) in the intake manifold based at least in part on the fresh air flow ($\dot{m}_{thr}$), the EGR gas flow ($\dot{m}_{egr}$), and the total gas flow ($\dot{m}_o$) entering the plurality of cylinders;

calculating the air fraction ($f_{air\_im}$) in the intake manifold based at least in part on the air mass ($m_{im\_air}$) entering the plurality of cylinders and the total mass ($m_{im}$) in the intake manifold;

calculating an oxygen mass concentration ($[O_2]_{m\_im}$) in the intake manifold based on the air fraction ($f_{air\_im}$) in the intake manifold;

determining an estimated temperature ($T_{im}$) in the intake manifold, wherein an estimated pressure ($p_{im}$) in the intake manifold is calculated according to the following equation:

$$p_{im} = R_{im} m_{im} T_{im} / V_{im} \quad (10)$$

where $V_{im}$ is a constant representative of a geometrical volume of the intake manifold, and $R_{im}$ is the constant R of the gas; and measuring a temperature ($T_{thr}$) of the gas flowing through the throttle valve and a temperature ($T_{egr}$) of the gas flowing through an EGR valve of the EGR system, wherein the estimated temperature ($T_{im}$) of the intake manifold is calculated according to the following equation:

$$T_{im} = \frac{\dot{m}_{thr} T_{thr} + \dot{m}_{egr} T_{egr}}{\dot{m}_{thr} + \dot{m}_{egr}}.$$

* * * * *